(12) United States Patent  
Ghosh et al.

(10) Patent No.: US 8,953,444 B2
(45) Date of Patent: Feb. 10, 2015

(54) LOAD BALANCING (75) Inventors: Donna Ghosh, San Diego, CA (US); Christopher Gerard Lott, San Diego, CA (US); Shweta Nandakumar, San Diego, CA (US); Rashid Ahmed Akbar Attar, San Diego, CA (US); Vinod V. Menon, San Diego, CA (US); Chunhao Chen, Escondido, CA (US); Kambiz Azarian-Yazdi, San Diego, CA (US); Radhika Gowaikar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 187 days.

(21) Appl. No.: 13/167,169

(22) Filed: Jun. 23, 2011

(65) Prior Publication Data

US 2012/0020209 A1 Jan. 26, 2012

Related U.S. Application Data (60) Provisional application No. 61/358,539, filed on Jun. 25, 2010.

(51) Int. Cl.
  *H04W 28/08* (2009.01)
  *H04L 12/26* (2006.01)
  *H04W 36/22* (2009.01)
  *H04W 48/06* (2009.01)
  *H04W 48/20* (2009.01)
  *H04W 72/04* (2009.01)
  *H04W 88/02* (2009.01)
  *H04W 88/08* (2009.01)

(52) U.S. Cl.
  CPC .............. *H04W 36/22* (2013.01); *H04W 28/08* (2013.01); *H04W 48/06* (2013.01); *H04W 48/20* (2013.01); *H04W 72/0486* (2013.01); *H04W 88/02* (2013.01); *H04W 88/08* (2013.01)
  USPC .......................................... 370/230; 370/236

(58) Field of Classification Search
  CPC ..................................................... H04W 28/08
  USPC ........................... 370/228–234, 236; 455/453
  See application file for complete search history.

(56) References Cited

U.S. PATENT DOCUMENTS

| 6,385,449 | B2 | 5/2002 | Eriksson et al. | |
| 6,738,625 | B1 * | 5/2004 | Oom et al. | 455/453 |
| 7,804,797 | B2 * | 9/2010 | Mori et al. | 370/318 |
| 8,427,942 | B2 * | 4/2013 | Kim et al. | 370/229 |
| 2002/0097747 | A1 * | 7/2002 | Kirkby et al. | 370/468 |

(Continued)

FOREIGN PATENT DOCUMENTS

| EP | 2207277 A1 | 7/2010 |
| WO | WO-2009050794 A1 | 4/2009 |

*Primary Examiner* — Nicholas Jensen
*Assistant Examiner* — Berhanu Belete
(74) *Attorney, Agent, or Firm* — Jeffrey Jacobs (57) ABSTRACT A method of communicating in a wireless network including receiving effective load values for sectors accessible to an access terminal of the wireless network. The effective load values represent effective loads on the sectors. The method also includes receiving pilot signal channel quality values of the sectors and selecting a serving sector, for the access terminal based on the effective load values and the pilot signal channel quality values.

20 Claims, 5 Drawing Sheets

(56) References Cited

U.S. PATENT DOCUMENTS

| | | | |
|---|---|---|---|
| 2005/0086295 A1* | 4/2005 | Cunningham et al. | 709/203 |
| 2005/0281278 A1* | 12/2005 | Black et al. | 370/412 |
| 2007/0109980 A1* | 5/2007 | Awater et al. | 370/310 |
| 2007/0185975 A1* | 8/2007 | Cunningham et al. | 709/217 |
| 2009/0285159 A1* | 11/2009 | Rezaiifar et al. | 370/328 |
| 2009/0318161 A1* | 12/2009 | Lopes | 455/453 |
| 2010/0165845 A1* | 7/2010 | Lott et al. | 370/235 |
| 2010/0315950 A1* | 12/2010 | Venkataraman et al. | 370/235 |

* cited by examiner

LOAD BALANCING

CROSS-REFERENCE TO RELATED APPLICATION

This application claims the benefit under 35 U.S.C. §119(e) to U.S. Provisional Patent Application No. 61/358,539 entitled Load Balancing In Wireless Networks, filed on Jun. 25, 2010, the disclosure of which is expressly incorporated by reference herein in its entirety.

BACKGROUND

1. Field

Aspects of the present disclosure relate generally to wireless communication systems, and more particularly to load balancing in wireless networks, such as EVDO, HSPA and LTE networks.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs) or Access Terminals (AT). The UEs or ATs may be dispersed throughout the network. Each base station may serve one or more UEs or ATs at any given moment. A UE or AT may communicate with a base station via the downlink and uplink. The downlink (or forward link) refers to the communication link from the base station to the UE or AT, and the uplink (or reverse link) refers to the communication link from the UE or AT to the base station.

A base station may transmit data and control information on the downlink to a UE or AT and/or may receive data and control information on the uplink from the UE or AT. On the downlink, a transmission from the base station may encounter interference due to transmissions from neighbor base stations or from other wireless radio frequency (RF) transmitters. On the uplink, a transmission from the UE or AT may encounter interference from uplink transmissions of other UEs or ATs communicating with the neighbor base stations or from other wireless RF transmitters. This interference may degrade performance on both the downlink and uplink.

Moreover, although heavily loaded sectors may have lightly loaded neighbors, current server selection solutions usually do not consider the load of neighbor cells. Rather, current solutions are based on purely downlink channel quality.

As the demand for mobile broadband access continues to increase, the possibilities of interference and congested networks grows with more UEs or ATs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

According to some aspects of the disclosure, a method of communicating in a wireless network includes receiving effective load values for sectors accessible to an access terminal of the wireless network. The effective load values may represent effective loads on the sectors. The method may also include receiving pilot signal channel quality values of the sectors and selecting a serving sector, from the sectors, for the access terminal based on the effective load values and the pilot signal channel quality values.

According to some aspects of the disclosure, a method of communicating in a wireless network includes receiving effective load values at an access terminal for accessible sectors of the wireless network. The effective load values may represent effective loads on the sectors. The method may also include identifying pilot signal channel quality values of the accessible sectors. The method may also include selecting a serving sector, from the accessible sectors, for the access terminal based on the effective load values and the pilot signal channel quality values.

According to some aspects of the disclosure, an apparatus for communicating in a wireless network includes means for receiving effective load values for sectors accessible to an access terminal of the wireless network. The effective load values may represent effective loads on the sectors. The apparatus may also include means for receiving pilot signal channel quality values of the sectors. The apparatus may further include means for selecting a serving sector, from the sectors, for the access terminal based on the effective load values and the pilot signal channel quality values.

According to some aspects of the disclosure, an apparatus for communicating in a wireless network includes means for receiving effective load values at an access terminal for accessible sectors of the wireless network. The effective load values may represent effective loads on the sectors. The apparatus may also include means for identifying pilot signal channel quality values of the accessible sectors. The apparatus may further include means for selecting a serving sector, from the accessible sectors, for the access terminal based on the effective load values and the pilot signal channel quality values.

According to some aspects of the disclosure, an apparatus for communicating in a wireless network includes a memory and at least one processor coupled to the memory. The processor(s) is configured to receive effective load values for sectors accessible to an access terminal of the wireless network. The effective load values may represent effective loads on the sectors. The processor(s) is further configured to receive pilot signal channel quality values of the sectors. The processor(s) may also be configured to select a serving sector, from the sectors, for the access terminal based on the effective load values and the pilot signal channel quality values.

According to some aspects of the disclosure, an apparatus for communicating in a wireless network includes a memory and at least one processor coupled to the memory. The processor(s) is configured to receive effective load values at an access terminal for accessible sectors of the wireless network. The effective load values may represent effective loads on the sectors. The processor(s) is further configured to identify pilot signal channel quality values of the accessible sectors. The processor(s) may also be configured to select a serving sector, from the accessible sectors, for the access terminal based on the effective load values and the pilot signal channel quality values.

According to some aspects of the disclosure, a computer program product for wireless communications in a wireless network includes a computer-readable medium having non-transitory program code recorded thereon. The program code includes program code to receive effective load values for sectors accessible to an access terminal of the wireless network. The effective load values may represent effective loads on the sectors. The program code also includes program code to receive pilot signal channel quality values of the sectors. The program code may also include program code to select a serving sector, from the sectors, for the access terminal based on the effective load values and the pilot signal channel quality values.

According to some aspects of the disclosure, a computer program product for wireless communications in a wireless network includes a computer-readable medium having non-transitory program code recorded thereon. The program code includes program code to receive effective load values at an access terminal for accessible sectors of the wireless network. The effective load values may represent effective loads on the sectors. The program code also includes program code to identify pilot signal channel quality values of the accessible sectors. The program code may also include program code to select a serving sector, from the accessible sectors, for the access terminal based on the effective load values and the pilot signal channel quality values.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. IS-856 is commonly referred to as 1xEV-DO, high rate packet data (HRPD), etc. Evolution Data Optimized (EV-DO) is a telecommunications standard promulgated by the $3^{rd}$ Generation Partnership Project 2 as part of the CDMA2000 family. EV-DO facilitates high data rates in wireless networks. EV-DO has gone through several evolutions, of which some revisions provide for a forward link using Time Division Multiple Access (TDMA) principles to transmit data sub-streams on multiple carriers (tones).

A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Figure 1:
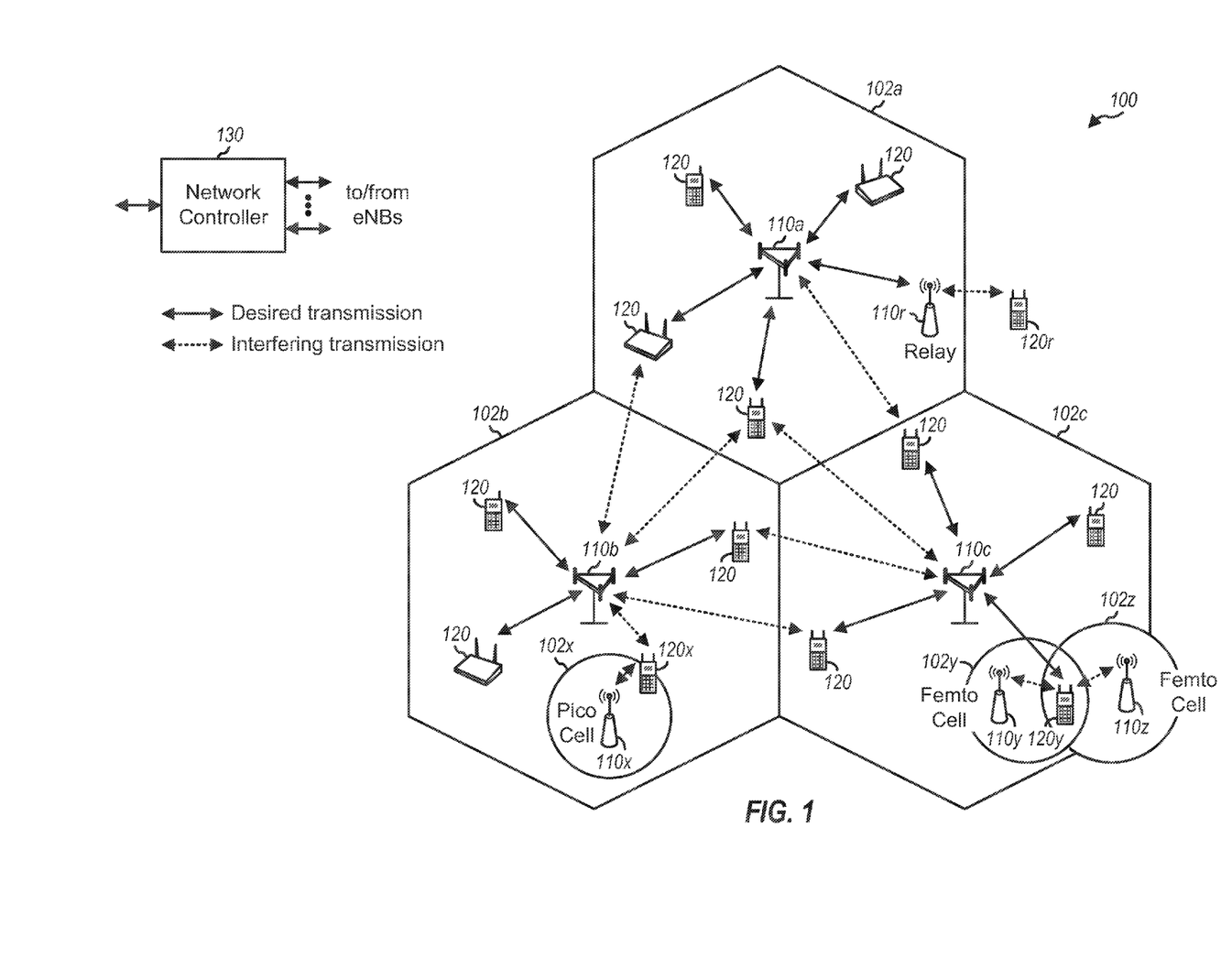
FIG. 1 is a block diagram conceptually illustrating an example of a telecommunications system.

FIG. 1 shows a wireless communication network 100, which may be an LTE-A network, in which load balancing may be implemented. The wireless network 100 includes a number of evolved node Bs (eNodeBs) 110 and other network entities. An eNodeB may be a station that communicates with the UEs and may also be referred to as a base station, base transceiver station (BTS) a node B, a base station controller (BSC), an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

To improve system capacity, the overall coverage area of a base station or eNodeB may be partitioned into multiple (e.g., three) smaller areas. Each smaller area may be served by a respective base station subsystem. In 3GPP, the term "cell" can refer to the smallest coverage area of a base station and/or a base station subsystem serving this coverage area. In 3GPP2, the term "sector" or "cell-sector" can refer to the smallest coverage area of a base station and/or a base station subsystem serving this coverage area. For clarity, 3GPP2 concept of "sector" is used in the description below. A base station may support one or multiple (e.g., three) sectors.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. In addition, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. In addition, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 are dispersed throughout the wireless network 100, and each UE may be stationary or mobile. A UE may also be referred to as a terminal, a mobile station, a subscriber unit, an access terminal (AT), a station, or the like. A UE may be a cellular phone, a personal digital assistant (PDA), a wireless modem, a wireless communication device, a handheld device, a laptop computer, a cordless phone, a wireless local loop (WLL) station, a tablet, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

Figure 4:
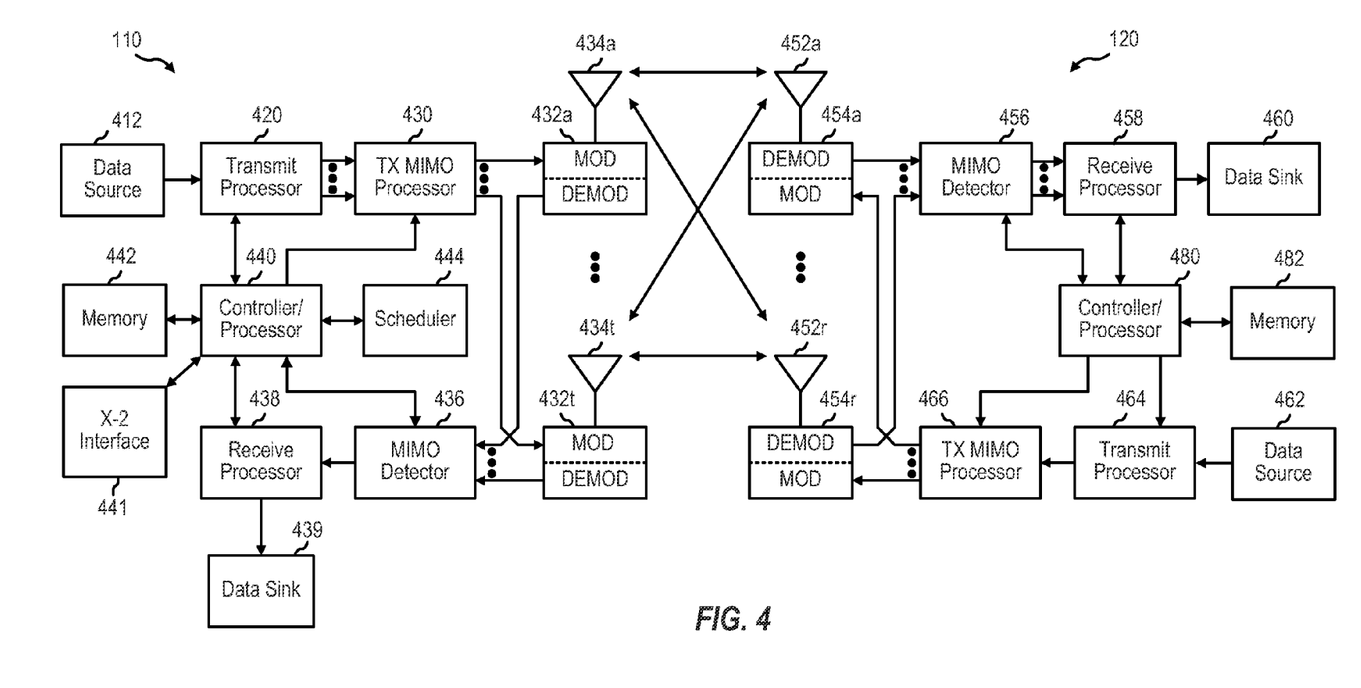
FIG. 4 is a block diagram conceptually illustrating a design of a base station/eNodeB and a UE configured according to one aspect of the present disclosure.

FIG. 4 shows a block diagram of a design of a base station/eNodeB 110 and a UE 120, which may be one of the base stations/eNodeBs and one of the UEs in FIG. 1. The base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

The controllers/processors 440 and 480 may direct the operation at the base station 110 and the UE 120, respectively. The processor 440 and/or other processors and modules at the base station 110 may perform or direct the execution of various processes for the techniques described herein. The processors 440, 480 and/or other processors and modules at the UE 120 and eNodeB 110 may also perform or direct the execution of the functional blocks illustrated in the method flow charts of FIGS. 2 and 3, and/or other processes for the techniques described herein. The memories 442 and 482 may store data and program codes for the base station 110 and the UE 120, respectively. A scheduler 444 may schedule UEs for data transmission on the downlink and/or uplink.

Figure 5:
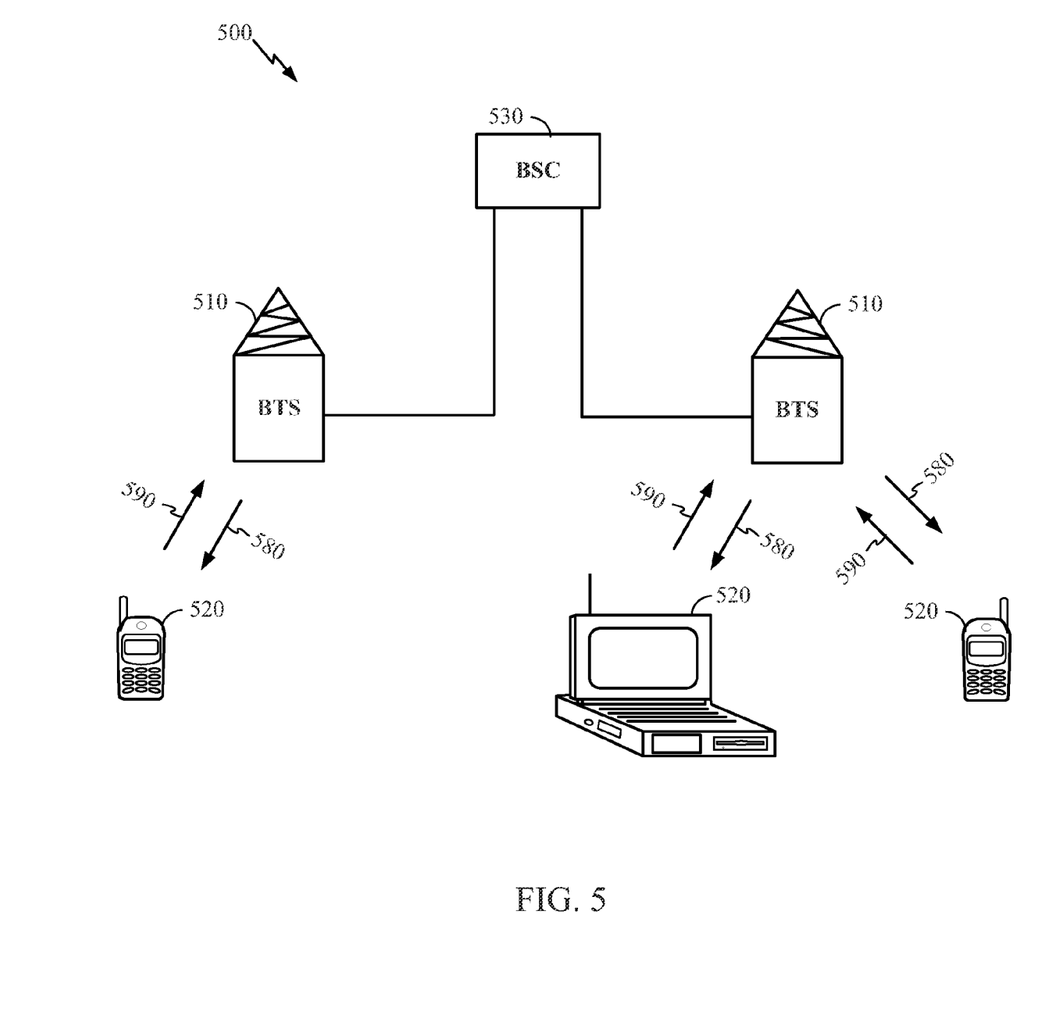
FIG. 5 shows an exemplary wireless communication system according to some aspects of the disclosure.

FIG. 5 shows an exemplary wireless communication system 500 according to some aspects of the disclosure for an EVDO network, rather than an LTE network. For purposes of illustration, FIG. 5 shows remote units (or ATs) 520, base transceiver stations (BTSs)/base stations 510, and a base station controller (or BSC) 530. It will be recognized that wireless communication systems may have many more remote units BTSs and base stations controllers. The remote units 520 may be, for example, personal digital assistants (PDAs), smartphones, cellular phones, laptop computers, netbook computers, desktop computers, media extender devices, tablets, and media set top boxes, which in various aspects provide functionality for incorporating techniques into wireless broadband technology, such as Evolution Data optimized (EVDO), as discussed further below. The functionality described in more detail below can be implemented using executable code stored to a computer-readable medium integral to, or separate from, the remote units 520. FIG. 5 shows the forward link signals 580 from the base stations 510 and the remote units 520 and the reverse link signals 590 from the remote units 520 to the base stations 510.

The BSC 530 and/or other processors and modules at the BSC 530. may perform or direct the execution of various processes for the techniques described herein. The AT 520, BTS 510, BSC 530 and included processors and modules may also perform or direct the execution of the functional blocks illustrated in the method flow chart of FIGS. 2 and 3, and/or other processes for the techniques described herein.

Furthermore, the examples below specifically refer to components in an EVDO network, but the scope of aspects is not so limited. For instance, many of the features described below are adaptable for use in systems other than EVDO systems, such as systems using Universal Mobile Telecommunications System (UMTS), Global System for Mobile Communications/Enhanced Data Rates for GSM Evolution (GSM/EDGE), Long Term Evolution (LTE), LTE-Advanced and the like.

Load Balancing

Network load balancing (NLB) techniques or processes for performing server selection to balance the load of sectors in a wireless communication system are described. Server selection refers to a process to select a serving sector or cell for a terminal or access terminal (AT). In some aspects, the load balancing processes may be implemented on EV-DO revisions such as A, B, Rel0 and DO-Advanced network, although the process is equally applicable to other networks such as HSPA and LTE (e.g., single and multi-carrier LTE). Although single-carrier devices and networks are described, multi-carrier devices and networks may also employ the exemplary aspects disclosed herein.

As previously described above, the ATs may be distributed throughout the system or network, and each sector may have any number of ATs within its coverage. Some sectors may include many ATs and may be more heavily loaded whereas some other sectors may include few ATs and may be lightly loaded. In many instances, a heavily loaded sector may be adjacent to (e.g., surrounded by) one or more lightly loaded sectors.

In some aspects, network load balancing may be performed to move ATs from a heavily loaded sector to a lightly loaded sector in order to improve performance for all affected ATs as well as the system. Network load balancing may be performed based on various designs, which may be dependent on the signaling messages available to send server selection information to ATs, whether server selection is performed by the ATs or UEs (i.e., device-driven) or a network entity, e.g., eNodeB 110, BTS 510 or base station controller 530 (i.e., network induced), and/or other factors.

If an uplink-downlink imbalance is created by network load balancing (NLB), it may be addressed by adjusting the gains of uplink channels. When network load balancing processes are implemented at the network level (eNodeB, BSC and BTS) and at the access terminal (AT) or UE level, the AT could potentially not be served by the cell/sector with the strongest downlink pilot when it is in the network load balancing mode described here. The chosen downlink may be weaker in signal strength, and a symmetric uplink to that cell/sector may be correspondingly weak as well. To account for the correspondingly weak uplink, gains of uplink channels that the AT uses to send signals related to serving sector/cell selection, as well as any feedback for transmissions from the selected serving sector/cell, may be boosted to reach the new desired serving sector/cell.

In some aspects, it may be desirable to implement a network induced or driven network load balancing under the following conditions among others:

When a base station controller (BSC) determines that the AT has no Delay Sensitive flows, only Throughput Sensitive flows, on the carriers that network load balancing is to be performed.

When a BSC determines that the AT is in soft-handoff with multiple cells on the carriers under consideration for network load balancing and it has one sector in each cell that it can potentially receive service from at the current time on those carriers.

When the BSC determines that a multi-carrier AT can receive service from different cells/sectors on different carriers, i.e., it is not constrained to receive service from the same cell/sector on all carriers.

When the BSC determines that the AT does not support receiving an indication from the network containing relative sector load information for use by the AT for load balancing.

When the BSC determines that the AT can be requested to update the network with the most current Signal to Noise Ratios for the pilots transmitted by the sectors that the AT can receive service from.

In some aspects, server selection may be performed based on metrics such as an effective load ($N_{eff}$) on a sector carrier seen by an incoming throughput-sensitive (TS) flow and based on active ATs in a sector and their pilot strengths or pilot signal channel quality values. The metrics are the inputs for the network load balancing process. The $N_{eff}$ metric may capture or account for considerations such as number of existing throughput-sensitive-flows in the sector-carrier that compete for scheduler resources such as time, frequency, etc. (e.g., they have data to transmit in BTS buffers). The $N_{eff}$ metric may also take into consideration, scheduler resources that are available, that are normalized for any reserved scheduler resources in the sector (e.g., resources reserved for control channels, etc.). For example, if "n" scheduler time units out of "m" within a cycle are reserved, apply a normalization factor of m/(m−n). Further, the $N_{eff}$ metric takes into consideration different preferential weights of the scheduler fairness metric for a flow. $N_{eff}$ may be a proxy for determining how much competition an incoming throughput-sensitive flow faces for access to available scheduler resources. In some aspects, the effective load ($N_{eff}$) may also account for control channel overhead.

The $N_{eff}$ metric can be computed at the base transceiver station and forwarded to the base station controller for a network induced load balancing or forwarded to the AT for a device-induced load balancing. In some aspects, the Neff metric may be computed periodically and the periodically computed Neff metric can be filtered using a single-pole infinite impulse response (IIR) filter of time constant equal to 500 transmission units, for example. These periodic samples of $N_{eff}$ metric from the filter can be used for the network load balancing process.

A base transceiver station (BTS) may retrieve the effective load metric used for network load balancing (NLB) and decide when and how to transmit the effective load metric to the base station controller (BSC). In some aspects, when a "significant enough change" in the effective load metric curs, the BTS may convey effective load to the BSC. In some aspects, the BTS may aggregate effective load metrics from different sectors in a BTS, to reduce message size and frequency of transport to the BSC.

As noted previously, effective load is transported to the base station controller (BSC) or the AT from the base station transceiver (BTS). In some aspects, the effective load can be transported from the BTS to the BSC and the BSC then aggregates the effective load values across the BTSs and transports the aggregated values to the AT. In some aspects, a change of value of $N_{eff}$ may be used to determine when to transport $N_{eff}$ from the BTS to the BSC. For example, $N_{eff}$ can be transported when $N_{eff}$ is +/−X dB from the previously sent value, where X can be a selected value or a value determined based on the calculated effective load values.

Figure 6:
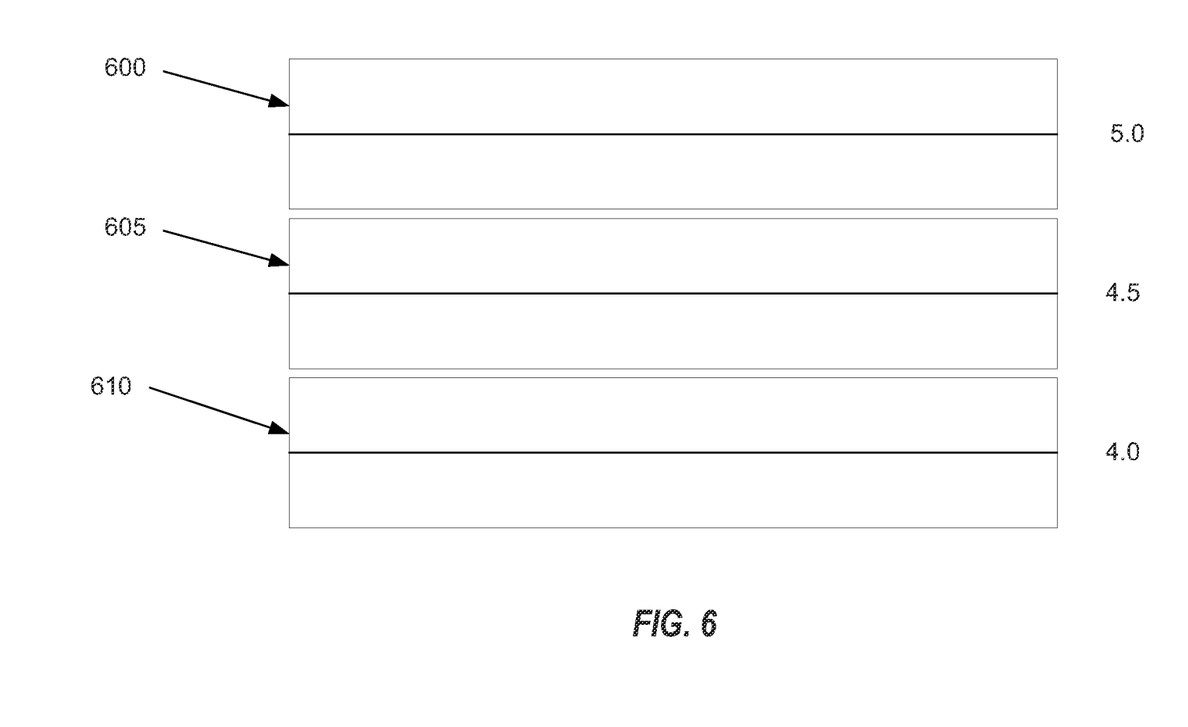
FIG. 6 illustrates when effective load metric of a sector carrier is transported from a base station controller from a base station transceiver according to some aspects of the disclosure.

In the example illustrated in FIG. 6, a change of $N_{eff}$ from a value of 4.5 dB at block 605 is translated as 5.0 dB at block 600 where X is a 0.5 dB increase. Likewise, a change of $N_{eff}$ from a value of 4.5 dB at block 605 is translated as 4.0 dB at block 610 where X is a 0.5 dB decrease. Any increase or decrease of 0.25 dB from the $N_{eff}$ of 4.5 dB results in no transportation of $N_{eff}$ to the BSC or AT. Therefore, $N_{eff}$ stays at block 605 where the boxes cover quarter dB units of change around 4.0 and 5.0 for some hysteresis. The BTS is configured to detect all $N_{eff}$ updatable changes and transports them to the BSC. In some aspects, the BTS uses a reliable path such as control-path, instead of data-path, to transport sector-carrier metrics, e.g., $N_{eff}$ from BTS to the BSC.

The BSC receives and stores sector-carrier metrics, such as $N_{eff}$, transported by all the sector-carriers from all the BTSs. In some aspects, a main processor may be used in the BSC that has communication links with all BTSs and all BSC call processing entities as the principal metric-data repository or metric-database. The main processor may serve as the proxy for the whole BSC and may provide improved backhaul efficiency because the BTSs can send information to only one location. In some aspects, the main processor can be configured to aggregate $N_{eff}$ metric across all BTSs and to cross-connect information across the BTSs for device or AT driven network load balancing, for example. The main processor may have communication links to all call processing entities/processors within the BSC.

When long latency exists in real-time access between the BSC's call-processing entity/processor and the main processor hosting the afore-mentioned metric-database, the metrics, e.g. $N_{eff}$, can be made locally available in all the call-processing processors through a database sync-up. The sync-up may be set to occur at a configurable periodicity. For example, sync-up may occur when metrics change. In some aspects, the sync-up may only include changed metrics within the period, which are marshaled and updated for efficiency (i.e., no full database dump).

The locally available storage in the call-processing BSC processors can be within a memory module that is common for all call-processing access and can be based on a pull model in which there is a single point of storage and the call processing entities get information as needed. The information is not pushed to those call-processing entities that do not need the information at the moment. The memory module can be based on a single-write multiple-reads architecture and may use double-buffering instead of Semaphore protection for efficiency.

As previously discussed, server selection may be performed based on an effective load ($N_{eff}$) on a sector carrier seen by an incoming throughput-sensitive (TS) flow and based on active ATs in a sector and their pilot strengths or pilot signal channel quality values. Metrics representing the active ATs in a sector and their pilot strengths or pilot signal channel quality values may be reported by the AT to the BSC when conditions change, for example. In some aspects, the BSC periodically solicits latest pilot strength or signal channel quality values reports periodically, e.g., every 4 seconds (i.e., pilot strength update period). The pilot strengths of the reported pilots are then stored by the BSC for use by the network load balancing process. In some aspects, if the solicited pilot strength report results in a change in set of sectors that the AT can receive service from, the related call processing is first performed, after which network load balancing process is executed. In some aspects, the input to the network load balancing process is the pilot channel quality (e.g., signal to noise ratio (SNR)). Thus, a serving sector may be selected for an AT based on a pilot signal to noise ratio (SNR) in conjunction with $N_{eff}$. In some aspects, SNR may be computed as follows:

$$\text{SNR (in dB)} = (Ec/Io)/(1 - Ec/Io);$$

where Ec/Io is the pilot strength reported by the AT to the BSC and is the energy per chip to total received power ratio.

In a network driven network load balancing process involving multi-carrier AT, for example, the BSC runs the following network load balancing process independently for each of the carriers the AT is assigned on. In some aspects, the process is conditioned on the fact that the AT can receive service on each of the carriers from different cells/sectors. Otherwise, the BSC may not perform network load balancing process for such ATs.

In some aspects, airlink or radio access technology, e.g., multi-carrier HSPA, may not allow the AT to point to different sectors across carriers. In this case, even though a suitability metric can be computed separately for each carrier, sector A in carrier 1, for example, sector B in carrier 2, for example, may be better than the current serving sector. While the AT in some radio access technology can be served from different sectors and different carriers, in multi-carrier HSPA system, for example, the AT is served from the same sector on all the carriers even though the suitability metric may suggest otherwise. In this case, the criteria may be based on the suitability metric in conjunction with other functions.

In some aspects, for example, multi-carrier and single-carrier LTE, where a first system may be deployed at a first bandwidth (e.g., 10 MHz) and a second system is deployed at a second bandwidth (e.g., 5 MHz) the effective load ($N_{eff}$)

may be normalized to the bandwidth. For example, if the effective load ($N_{eff}$) for the 10 MHz system and the 5 MHz system are the same, it may be desirable or likely that that the 10 MHz system is more lightly loaded and selected instead of the 5 MHz system.

In some aspects, the BSC determines the AT's capability to be solicited for pilot strength reports in order to obtain the latest values. The BSC may run the network load balancing evaluation for an AT during an active set change and/or $N_{eff}$ updates. The AT may maintain a set of candidate sectors that can serve the AT, which may be referred to as an active set. A BSC's call processing entity for a given AT may check for $N_{eff}$ updates in the BSC database periodically, i.e., network load balancing periodicity. For example, the BSC call processing entity may check every 2 seconds.

In some aspects, the BSC may request pilot strength reports periodically for a network load balancing candidate, and record the updated pilot strengths. The request can be sent every four seconds, for example, and a timer can be run independently for each AT.

The execution of network load balancing processing may be distributive in nature. For example, the pilot strength request timer and network load balancing candidate evaluation timer may be AT specific to introduce a time-randomness in network load balancing operation across ATs and avoid mass swings from cell/sector to cell/sector before the feedback loop ($N_{eff}$ update) responds.

In some aspects, the sector/cell with the highest pilot signal to noise ratio (SNR) can be among those sectors/cells that the AT is allowed to select for service. The selection of a sector may be based on a suitability metric given by the difference between the pilot signal to noise ratio and $N_{eff}$ (i.e., pilot SNR−$N_{eff}$(dB)). For example, the suitability metric differential may be 2 dB. At each periodic evaluation instance, for example, the current serving sector/cell and the sector/cell with the highest suitability metric is determined.

If the pilot SNR of the current serving sector/cell and a serving cell/sector with the highest suitability metric at an evaluation instance are below a threshold, indicating an overall poor set of downlinks to choose from, the AT's server selection mechanism can choose or select across all available sectors/cells and the network may not disallow any sector/cell. In some aspects, the current serving sector/cell can be the sector/cell with the highest suitability metric in an evaluation instance. In this case, the AT may continue to select the current serving sector/cell.

Otherwise, if either of the following conditions are satisfied: the highest suitability metric exceeds that of the current serving sector/cell by a threshold value, or the pilot SNR of the current serving sector/cell is below a threshold value then the AT can be prevented from selecting those sectors/cells having pilot channel qualities (e.g., SNRs) exceeding the pilot channel quality (e.g., SNR) of the sector/cell with the highest suitability metric. This feature can be accomplished by implementing a feedback from those sectors/cells to the AT indicating that the AT's selection of these sectors/cells for service cannot be satisfied. If these conditions are not satisfied, the AT is allowed to continue selecting its current serving sector/cell.

When a delay-sensitive flow is added on any carrier, and network load balancing is in a mode that has excluded a subset of sectors, on that carrier, from selection for service by the AT, the network may not disallow any sector/cell from being selected by the AT for service. An AT subjected to these conditions is no longer a network load balancing candidate on that carrier until that delay-sensitive flow is removed.

In an AT driven network load balancing process, if the BSC determines that a given AT supports receiving an indication from the network containing relative sector load information and the AT can use this information to independently implement load balancing, the BSC may not implement a network driven network load balancing process described in the preceding sections. Instead, if there are such ATs that support the AT driven network load balancing process in the system, the BSC may direct the BTS to broadcast a load information message on each of its sectors. The message sent on a sector may contain its load information, as well as that of its neighbors.

The broadcast load information message may include fields such as LoadingAdjust and NeighborSectorLoadingAdjust. The LoadingAdjust field entails loading adjustment of a current sector and may be in units of decibels (dB), e.g., 0.5 dB. The NeighborSectorLoadingAdjust can be the loading adjustment of the current sector's neighbors, and may be in units of decibels (dB), e.g., 0.5 dB.

If the AT is informed of the list of neighboring sectors in any control message (that could be broadcast) from a sector before it connects for service with the network, the network and the AT can thereafter agree to pair up the ordered listing of NeighborSectorLoadingAdjust fields in this load information message with the ordered listing of neighbors in the aforementioned control message. This can reduce the message overheads in periodic over the air transmission by avoiding a neighbor sector identifier associated with the LoadingAdjust.

The LoadingAdjust and NeighborSectorLoadingAdjust can be populated as follows:

Let sectors s1, s2, . . . , si, . . . , sN map to $N_{eff\_1}$, $N_{eff\_2}$, . . . , $N_{eff\_i}$, . . . $N_{eff\_N}$.

Let sector sr have the least $N_{eff}$ $N_{eff\_r}$=min($N_{eff\_i}$, for all i from 1 to N)

LoadingAdjust for sector si=10*log 10($N_{eff\_i}$/$N_{eff\_r}$)

The BSC may forward the LoadingAdjust values for the given sector and its neighbors to the BTS. The BSC receives the $N_{eff}$ metric from multiple BTS's as explained earlier in the context of network driven network load balancing. The BSC periodically updates each BTS with the information to set the LoadingAdjust values in the LoadInformation message for that BTS's sectors, and its neighbors, captured in the interval since the previous update. The BTS may sequence the NeighborSectorLoadAdjust and may update values in the next LoadInformation message transmitted. The BTS may also transmit the LoadInformation message in a broadcast control packet.

The load information message may be a lower priority message and may be sent if other higher priority messages together with the load information message do not increase the message size to require extra quanta of message packets. The load information message may be targeted for ATs that are in connection, and not in sleep mode. Those ATs that are in sleep mode, and wake up to listen to control transmissions from the network may not be requested to stay awake longer than typically needed, just to receive this message, which would be superfluous for the AT in that state.

Figure 2:
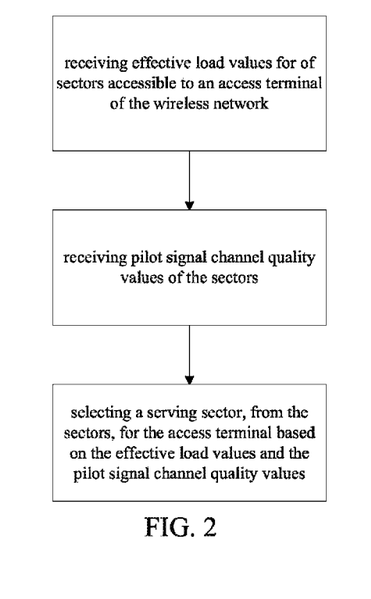
FIG. 2 is a block diagram illustrating a method for load balancing in a wireless network.

FIG. 2 is a block diagram illustrating a method or process for load balancing in a wireless network. The process begins at block 202 where the effective load values for sectors accessible to an access terminal of the wireless network is received. The effective load values may represent effective loads on the sectors. At block 204, pilot signal channel quality values of the sectors are received. Finally, at block 206, a serving sector is selected, from the sectors, for the access terminal based on the effective load values and the pilot signal channel quality values.

Figure 3:
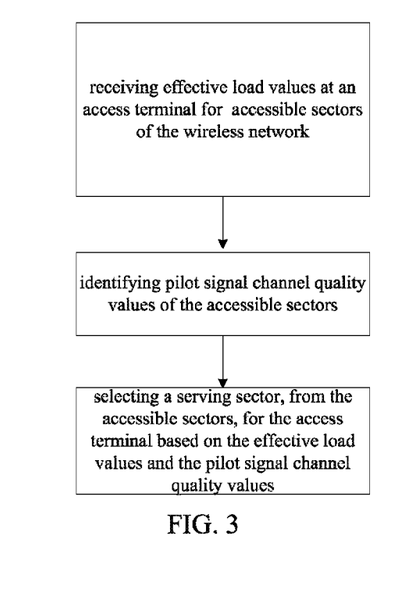
FIG. 3 is a block diagram illustrating a method for communicating in a wireless network.

FIG. 3 is a block diagram illustrating a method or process for communicating in a wireless network. The process begins at block 302 where effective load values at an access terminal for accessible sectors of the wireless network are received. The effective load values may represent effective loads on the sectors. At block 304, pilot signal channel quality values of the accessible sectors are identified. Finally, at block 306 a serving sector is selected, from the accessible sectors, for the access terminal based on the effective load values and the pilot signal channel quality values.

In one configuration, the eNodeB 110 or BSC 530 is configured for wireless communication including means for receiving effective load values for sectors accessible to an access terminal of the wireless network. In one aspect, the receiving means may be the controller processor 440 and memory 442, the receive processor 438, demodulators 432a-432t and antenna 434a-t configured to perform the functions recited by the receiving means. The eNodeB 110 or BSC 530 is also configured to include a means for receiving pilot signal channel quality values of the sectors. In one aspect, the receiving means may be the controller processor 440 and memory 442, the receive processor 438, demodulators 432a-432t and antenna 434a-t configured to perform the functions recited by the receiving means. The eNodeB 110 or BSC 530 is also configured to include a means for selecting a serving sector, for the access terminal based on the effective load values and the pilot signal channel quality values. In one aspect, the selecting means may be the controller processor 440 and memory 442 configured to perform the functions recited by the selecting means. In another aspect, the aforementioned means may be a module or any apparatus configured to perform the functions recited by the aforementioned means.

In one configuration, the UE 120 or AT 520 is configured for wireless communication including means for receiving effective load values at an access terminal for accessible sectors of the wireless network. In one aspect, the receiving means may be the controller/processor 480, and memory 482, the receive processor 458, demodulators 454a-454r and antenna 452a-r configured to perform the functions recited by the receiving means. The UE 120 or AT 520 is also configured to include a means for identifying pilot signal channel quality values of the accessible sectors. In one aspect, the identifying means may be the controller/processor 480, and memory 482 configured to perform the functions recited by the identifying means. The UE 120 or AT 520 is also configured to include a means for selecting a serving sector, for the access terminal based on the effective load values and the pilot signal channel quality values. In one aspect, the selecting means may be the controller/processor 480, and memory 482 configured to perform the functions recited by the selecting means. In another aspect, the aforementioned means may be a module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of communicating in a wireless network, comprising:
   determining by a controller when an access terminal has throughput sensitive flows and no delay sensitive flows; and
   load balancing by performing server selection to balance the load of a plurality of sectors of the wireless network in response to the determining, comprising:
      receiving effective load values seen by incoming throughput sensitive flows for the plurality of sectors accessible to the access terminal of the wireless network, the effective load values representing effective loads on the plurality of sectors;
      receiving pilot signal channel quality values of the plurality of sectors; and
      selecting a serving sector, from the plurality of sectors, for the access terminal based on the effective load values and the pilot signal channel quality values by subtracting an effective load value of each sector from a pilot signal channel quality of each sector to determine a suitability metric for each of the plurality of sectors for which an effective load value is received, and selecting a sector with a highest suitability metric.

2. The method of claim 1, in which the throughput sensitive flows in a sector of the plurality of sectors compete for scheduler resources.

3. The method of claim 1, further comprising computing the effective load values and the suitability metric for each carrier of a multi-carrier configuration of the access terminal.

4. The method of claim 1, further comprising receiving a current effective load value of the effective load values when a difference between the current effective load value and a prior effective load value meets a threshold value.

5. The method of claim 1, in which the receiving, receiving and selecting are implemented independently for each carrier of a multi-carrier configuration of the access terminal.

6. A method of communicating in a wireless network, comprising:
   load balancing by performing server selection to balance the load of a plurality of accessible sectors of the wireless network in response to the determining that an access terminal has throughput sensitive flows and no delay sensitive flows, comprising:
      receiving effective load values seen by incoming throughput sensitive flows at the access terminal for the plurality of accessible sectors of the wireless network, in which the receiving is based at least in part on the determination that the access terminal has throughput sensitive flows and no delay sensitive flows, the effective load values representing effective loads on the sectors;
      identifying pilot signal channel quality values of the plurality of accessible sectors; and
      selecting a serving sector, from the plurality of accessible sectors, for the access terminal based on the effective load values and the pilot signal channel quality values by subtracting an effective load value of each sector from a pilot signal channel quality of each sector to determine a suitability metric for each of the plurality of sectors for which an effective load value is received, and selecting a sector with a highest suitability metric.

7. The method of claim 6, in which the existing throughput sensitive flows in a sector of the plurality of accessible sectors compete for scheduler time and scheduler resources.

8. The method of claim 6, further comprising
   receiving loading adjustment information of a sector represented by a ratio of an effective load of the sector to that of a sector with a least effective load; and
   selecting the serving sector, from the plurality of accessible sectors, for the access terminal based at least in part on the loading adjustment information.

9. An apparatus for communicating in a wireless network, comprising:
   means for determining when an access terminal has throughput sensitive flows and no delay sensitive flows; and
   means for load balancing by performing server selection to balance the load of a plurality of sectors of the wireless network when the access terminal has throughput sensitive flow and no delay sensitive flows, comprising:
      means for receiving effective load values seen by incoming throughput sensitive flows for the plurality of sectors accessible to the access terminal of the wireless network, the effective load values representing effective loads on the plurality of sectors;
      means for receiving pilot signal channel quality values of the plurality of sectors; and
      means for selecting a serving sector, from the plurality of sectors, for the access terminal based on the effective load values and the pilot signal channel quality values by means for subtracting an effective load value of each sector from a pilot signal channel quality of each sector to determine a suitability metric for each of the plurality of sectors for which an effective load value is received, and means for selecting a sector with a highest suitability metric.

10. An apparatus for communicating in a wireless network, comprising:
    means for load balancing by performing server selection to balance the load of a plurality of accessible sectors of the wireless network in response to the determining that the access terminal has throughput sensitive flows and no delay sensitive flows, comprising:
       means for receiving effective load values seen by incoming throughput sensitive flows at the access terminal for the plurality of accessible sectors of the wireless network, in which the receiving is based at least in part on a determination that the access terminal has throughput sensitive flows and no delay sensitive flows, the effective load values representing effective loads on the sectors;
       means for identifying pilot signal channel quality values of the plurality of accessible sectors; and
       means for selecting a serving sector, from the plurality of accessible sectors, for the access terminal based on the effective load values and the pilot signal channel quality values by means for subtracting an effective load value of each sector from a pilot signal channel quality of each sector to determine a suitability metric for each of the plurality of sectors for which an effective load value is received, and means for selecting a sector with a highest suitability metric.

11. An apparatus for communicating in a wireless network, comprising:
a memory; and
at least one processor coupled to the memory and configured:
to determine when an access terminal has throughput sensitive flows and no delay sensitive flows; and
to load balance by performing server selection to balance the load of a plurality of sectors of the wireless network when the access terminal has throughput sensitive flow and no delay sensitive flows by:
receiving effective load values seen by incoming throughput sensitive flows for the plurality of sectors accessible to the access terminal of the wireless network, the effective load values representing effective loads on the plurality of sectors;
receiving pilot signal channel quality values of the plurality of sectors; and
selecting a serving sector, from the plurality of sectors, for the access terminal based on the effective load values and the pilot signal channel quality values subtracting an effective load value of each sector from a pilot signal channel quality of each sector to determine a suitability metric for each of the plurality of sectors for which an effective load value is received, and selecting a sector with a highest suitability metric.

12. The apparatus of claim 11, in which the throughput sensitive flows in a sector of the plurality of sectors compete for scheduler resources.

13. The apparatus of claim 11, in which the at least one processor is further configured to compute the effective load values and the suitability metric for each carrier of a multi-carrier configuration of the access terminal.

14. The apparatus of claim 11, in which the at least one processor is further configured to receive a current effective load value of the effective load values when a difference between the current effective load value and a prior effective load value meets a threshold value.

15. The apparatus of claim 11, in which the at least one processor is further configured to receive the effective load values, to receive the pilot signal channel quality values and to select a serving sector independently for each carrier of a multi-carrier configuration of the access terminal.

16. An apparatus for communicating in a wireless network, comprising:
a memory; and
at least one processor coupled to the memory and configured:
to load balance by performing server selection to balance the load of a plurality of accessible sectors of the wireless network in response to determining that the access terminal has throughput sensitive flows and no delay sensitive flows by:
receiving effective load values seen by incoming throughput sensitive flows at the access terminal for the plurality of accessible sectors of the wireless network, in which the receiving is based at least in part on a determination that the access terminal has the throughput sensitive flows and no delay sensitive flows, the effective load values representing effective loads on the sectors;
identifying pilot signal channel quality values of the plurality of accessible sectors; and
selecting a serving sector, from the plurality of accessible sectors, for the access terminal based on the effective load values and the pilot signal channel quality values by subtracting an effective load value of each sector from a pilot signal channel quality of each sector to determine a suitability metric for each of the plurality of sectors for which an effective load value is received, and selecting a sector with a highest suitability metric.

17. The apparatus of claim 16, in which the throughput sensitive flows in a sector of the plurality of accessible sectors compete for scheduler time and scheduler resources.

18. The apparatus of claim 16, in which the at least one processor is further configured:
to receive loading adjustment information of a sector represented by a ratio of an effective load of the sector to that of a sector with a least effective load; and
to select the serving sector, from the plurality of accessible sectors, for the access terminal based at least in part on the loading adjustment information.

19. A computer program product for wireless communications in a wireless network, comprising:
a non-transitory computer-readable medium having program code recorded thereon, the program code comprising:
program code to determine when an access terminal has throughput sensitive flows and no delay sensitive flows; and
program code to load balance by performing server selection to balance the load of a plurality of sectors of the wireless network when the access terminal has throughput sensitive flow and no delay sensitive flows by:
receiving effective load values seen by incoming throughput sensitive flows for the plurality of sectors accessible to the access terminal of the wireless network, the effective load values representing effective loads on the plurality of sectors;
receiving pilot signal channel quality values of the plurality of sectors; and
selecting a serving sector, from the plurality of sectors, for the access terminal based on the effective load values and the pilot signal channel quality values by subtracting an effective load value of each sector from a pilot signal channel quality of each sector to determine a suitability metric for each of the plurality of sectors for which an effective load value is received, and selecting a sector with a highest suitability metric.

20. A computer program product for wireless communications in a wireless network, comprising:
a non-transitory computer-readable medium having program code recorded thereon, the program code comprising:
program code to load balance by performing server selection to balance the load of a plurality of accessible sectors of the wireless network in response to determining that an access terminal has throughput sensitive flows and no delay sensitive flows, comprising:
program code to receive effective load values seen by incoming throughput sensitive flows at the access terminal for the plurality of accessible sectors of the wireless network, in which the receiving is based at least in part on a determination that the access terminal has the throughput sensitive flows and no delay sensitive flows, the effective load values representing effective loads on the sectors;
program code to identify pilot signal channel quality values of the plurality of accessible sectors; and
program code to select a serving sector, from the plurality of accessible sectors, for the access terminal based on the effective load values and the pilot signal channel quality values by program code to subtract an effective load value of each sector from a pilot signal channel quality of each sector to determine a suitability metric for each of the plurality of sectors for which an effective load value is received, and program code to select a sector with a highest suitability metric.

\* \* \* \* \*